(12) United States Patent
Persson

(10) Patent No.: US 11,759,811 B2
(45) Date of Patent: Sep. 19, 2023

(54) SPRAY APPLICATION SYSTEM WITH MEMORY AND CONTROLLER FOR CONTROLLING SPRAY BAR

(71) Applicant: BALDWIN JIMEK AB, Arlöv (SE)

(72) Inventor: Daniel Persson, Sunnanväg (SE)

(73) Assignee: BALDWIN JIMEK AB, Arlöv (SE)

( * ) Notice: Subject to any disclaimer, the term of this patent is extended or adjusted under 35 U.S.C. 154(b) by 431 days.

(21) Appl. No.: 17/252,458

(22) PCT Filed: Jun. 26, 2019

(86) PCT No.: PCT/EP2019/067029
§ 371 (c)(1),
(2) Date: Dec. 15, 2020

(87) PCT Pub. No.: WO2020/002444
PCT Pub. Date: Jan. 2, 2020

(65) Prior Publication Data
US 2021/0187531 A1    Jun. 24, 2021

(30) Foreign Application Priority Data

Jun. 29, 2018  (SE) .................................... 1850820-0

(51) Int. Cl.
*B05B 12/00* (2018.01)
*G05B 15/02* (2006.01)
(Continued)

(52) U.S. Cl.
CPC .............. *B05B 12/004* (2013.01); *B05B 1/20* (2013.01); *B05B 15/50* (2018.02); *B41F 7/30* (2013.01);
(Continued)

(58) Field of Classification Search
CPC ......... B05B 12/004; B05B 1/20; B05B 15/50; B05B 12/32; B41F 7/30; B41F 33/0054;
(Continued)

(56) References Cited

U.S. PATENT DOCUMENTS 4,708,058 A * 11/1987 Smith ....................... B41F 7/30
                                                                     101/147
4,899,653 A *  2/1990 Michl ................. B41F 33/0054
                                                                     101/366
(Continued)

FOREIGN PATENT DOCUMENTS

DE         19642404 A1    4/1998
EP           325381 A2    7/1989
(Continued)

*Primary Examiner* — Ramesh B Patel
(74) *Attorney, Agent, or Firm* — Thompson Coburn LLP

(57) ABSTRACT

A service tracking system for a printing press (1), spray applicator (1') or the like includes at least one replaceable component (10) having at least one memory unit (20). The service tracking system further includes a controller (30) which is connected to the memory unit (20). The controller (30) is configured to control the operation of the replaceable component (10) and to periodically update data stored on the memory unit (20) related to run-time data regarding the operation of the specific replaceable component (10).

15 Claims, 3 Drawing Sheets

(51) Int. Cl.
  *B05B 1/20* (2006.01)
  *B05B 15/50* (2018.01)
  *B41F 7/30* (2006.01)
  *B41F 33/00* (2006.01)
  *B41F 35/06* (2006.01)

(52) U.S. Cl.
  CPC .......... *B41F 33/0054* (2013.01); *B41F 35/06* (2013.01); *G05B 15/02* (2013.01); *B41P 2235/26* (2013.01)

(58) Field of Classification Search
  CPC .......... B41F 35/06; B41F 33/00; B41F 33/02; G05B 15/02; B41P 2235/26; B41P 2235/246; G06Q 10/20
  See application file for complete search history.

(56) References Cited

U.S. PATENT DOCUMENTS

| | | | |
|---|---|---|---|
| 5,021,828 A | 6/1991 | Yamaguchi et al. | |
| 5,079,738 A * | 1/1992 | Bockenfeld | B41F 33/0009 101/248 |
| 5,272,503 A | 12/1993 | LeSueur et al. | |
| 5,644,981 A * | 7/1997 | Ohno | B41F 7/30 101/132.5 |
| 5,727,470 A * | 3/1998 | Kurzer | B41F 35/00 101/423 |
| 5,865,120 A * | 2/1999 | Gross | B41F 33/02 101/216 |
| 6,039,430 A * | 3/2000 | Helterline | B41J 2/17546 400/208 |
| 6,126,265 A | 10/2000 | Childers et al. | |
| 6,244,174 B1 | 6/2001 | Sirowitzki et al. | |
| 2002/0117065 A1 | 8/2002 | Hansson | |
| 2006/0086270 A1 * | 4/2006 | Hansson | B41F 7/30 101/147 |
| 2006/0230963 A1 | 10/2006 | Birger | |
| 2008/0271618 A1 * | 11/2008 | Gaugenrieder | B05B 15/555 101/147 |
| 2016/0001311 A1 * | 1/2016 | Kylling | B05C 1/025 118/244 |
| 2016/0066589 A1 * | 3/2016 | Massey | G01F 23/00 702/55 |
| 2017/0197228 A1 * | 7/2017 | Bjornson | B05B 15/18 |
| 2020/0016887 A1 * | 1/2020 | Bechberger | B41F 35/001 |
| 2020/0230632 A1 | 7/2020 | Kieffer | B05B 11/10 |
| 2021/0016309 A1 * | 1/2021 | Bremer | B05B 12/004 |
| 2021/0123936 A1 * | 4/2021 | Swanson | B01F 25/30 |
| 2021/0187531 A1 * | 6/2021 | Persson | G06Q 10/20 |
| 2022/0126315 A1 * | 4/2022 | Ross | B05B 15/00 |
| 2023/0035413 A1 * | 2/2023 | Bulaevskaya | G06Q 50/02 |

FOREIGN PATENT DOCUMENTS

| | | |
|---|---|---|
| EP | 0764535 A1 | 3/1997 |
| JP | S5973983 A | 4/1984 |
| JP | S63249656 A | 10/1988 |
| JP | H-02-006863 A | 1/1990 |
| JP | H-05-016334 A | 1/1993 |
| JP | H-05173729 A | 7/1993 |
| JP | H-08-207261 A | 8/1996 |
| JP | H-08-336944 A | 12/1996 |
| JP | H-11-070662 A | 3/1999 |
| JP | 2004-358412 A | 12/2004 |
| JP | 2004338234 A | 12/2004 |
| WO | 01/26817 A2 | 4/2001 |
| WO | 2008118285 A2 | 10/2008 |
| WO | 2018073025 A1 | 4/2018 |
| WO | 2018073026 A1 | 4/2018 |

* cited by examiner

SPRAY APPLICATION SYSTEM WITH MEMORY AND CONTROLLER FOR CONTROLLING SPRAY BAR

CROSS-REFERENCE TO RELATED APPLICATIONS

This application is a U.S. National Phase application of PCT/EP2019/067029, filed on Jun. 26, 2019, claiming the benefit of Swedish Patent Application No. 1850820-0, filed on Jun. 29, 2018, issued as SE Pat. No. 543,357 on Dec. 15, 2020, both of which are incorporated herein by reference in their entireties.

TECHNICAL FIELD

The present invention relates to a service tracking system for replaceable components of a printing press, spray applicator or the like. More particularly, the present invention relates to a service tracking system for spray bars and the like included in a spray applicator, a spray dampening system or the like.

BACKGROUND

Spray applicators and spray dampening systems are widely used in industries such as traditional printing and textiles. One of the most important parts of a spray applicator or a spray dampening system are valve rails, which provide fluids, such as fountain solution or softeners, to different parts of the machine. Valve rails in spray dampening systems are usually arranged in spray bars, which are well known in the prior art, see for instance US2006/0086270A1. In spray applicators, valve rails are arranged in chambers like spray bars, see for instance WO2018/073025A1 and WO2018/073026A1.

The repeated operation of opening valves to administer fluid to nozzles of a valve rail, which in turn spray the fluid, and then closing the valves again is called a stroke. Spray bars or the like in different parts of the machine may be operated under differently taxing conditions with more or fewer strokes per minute. The spray bars that operate under highly taxing conditions may require frequent service and repairs. In order to avoid downtime of the machine during spray bar service, spray bars are often replaced by a spare as they are usually interchangeable. The newly serviced spray bar may then be used to replace another spray bar in another part of the machine with different conditions. As these spray bars move between different parts of the machine in this manner, it becomes hard to track how many strokes each spray bar has performed, as the stroke frequency in different parts may vary by a large amount. This makes it difficult to predict when and where the next spray bar will break down. Preventative service is therefore impossible and periodic unplanned downtime for printing presses or spray applicators is unavoidable.

Problems that arise from the interchangeability of spray bars have been attempted to be solved before, however these known systems have mostly been focused on calibration. Some examples of background art are described in WO2008/118285A2 and WO2001/26817A2, where attempts have been made to solve the problem of different spray bars requiring different calibration. The spray bars need to be recalibrated each time valves are replaced, which hinders the interchangeability of them that is otherwise used to great effect to reduce downtime. These attempt to solve these problems, however they have not been fully successful. Hence, there is room for improvements.

There are other replaceable members of a printing press, a spray applicator or the like with similar features to spray bars that exhibit similar problems. One such example is cleaning cassettes, which are used to clean cylinders in a printing press. Cleaning cassettes are well known in the prior art, see for instance US2002/117065A1 and US2006/0230963A1.

SUMMARY

Thusly, the present invention strives to solve at least some of the above problems and to eliminate or at least mitigate some of the drawbacks of prior-art systems. This object has now been achieved in accordance with the invention by the novel technique set forth in the appended independent claims; preferred embodiments being defined in the related dependent claims.

A further object of the present invention is to provide a way to track when a spray bar or the like may need service. According to a first aspect, the above and other objects of the invention are achieved, in full or in part, by a service tracking system for a printing press, spray applicator or the like, comprising at least one replaceable component. The replaceable component comprises at least one memory unit. The service tracking system further comprises a controller connected to said at least one memory unit, wherein the controller is configured to control the operation of said at least one replaceable component and to periodically update data stored on each memory unit related to run-time data regarding the operation of the specific replaceable component comprising the memory unit. An advantage of the memory unit being comprised in the replaceable component is that the run-time data stored on it is always readily available close to the component. A further advantage of the memory unit being comprised in the replaceable component is that a replaceable component of prior art systems may be replaced by the replaceable component comprising a memory unit according to the inventive system. Hence, it is simple to update existing systems.

According to an embodiment, the memory unit comprises a unique identifier corresponding to the specific replaceable component comprising the memory unit. An advantage of this is that it guarantees that the memory unit is paired correctly.

In another embodiment, the replaceable component is a spray bar used in a spray dampening system of the printing press.

According to still another embodiment, the run-time data of the memory unit comprises a number of strokes performed by valves of valve rails of the comprising spray bar. An advantage of this is that strokes are useful as a measurement of when servicing is needed.

In an embodiment, the run-time data of the memory unit comprises operational time data related to the operational time of valves of valve rails of the comprising spray bar. An advantage of this is that operational time is useful as a measurement of when servicing is needed.

According to an embodiment, the run-time data of the memory unit comprises cleaning data related to when and for how long valve rails of the comprising spray bar have been cleaned. An advantage of this is that cleaning data is useful as a measurement of when servicing is needed.

In a further embodiment, the run-time data of each memory unit is only updated during the operation of the comprising replaceable component. An advantage of this is that it conserves energy as the run-time data only changes at this time. It also reduces the amount of write cycles.

According to another embodiment, the run-time data of the memory unit is only read by the controller each time the comprising replaceable component establishes a connection to the controller. An advantage of this is that it reduces reading operations as the controller can keep track of the input run-time data of the replaceable component.

In an embodiment, the memory unit is arranged in a water-proof housing. An advantage of this is that printing presses, spray applicators or the like may periodically fill with water.

According to an embodiment, the controller is in communication with a display. An advantage of this is that this improves the user feedback.

In yet another embodiment, the controller is further configured to display service notifications on the display related to a specific replaceable component when the data stored on the memory unit comprised in said replaceable component reaches one or more pre-programmed thresholds. An advantage of this is that this improves the user feedback.

According to an embodiment, the controller is configured to automatically request service for a specific replaceable component when the data stored on the memory unit comprised in the replaceable component reaches one or more pre-programmed thresholds. An advantage of this is that it reduces human error.

In an embodiment, the memory unit further comprises an event log for events related to the comprising replaceable component. An advantage of this is that it improves the accuracy and usefulness of servicing.

According to a further embodiment, events are only saved to the event log by manual command. An advantage of this is that it secures the accuracy of the event log.

In an embodiment, the service tracking system further comprises a service station for performing service on the replaceable component. The service station comprises a service controller in communication with said at least one memory unit and configured to control the operation of servicing and to log service events related to the replaceable component to the event log in the comprised memory unit. An advantage of this is that servicing is performed in a standardized manner.

According to an embodiment, the service station further comprises a service display comprising a user interface that allows for a manual command to log service events. An advantage of this is that it improves the user feedback.

In a second aspect, a spray bar for use in a service tracking system according to the previous aspect is provided. The spray bar comprises a valve rail for administering fluid; and a shroud for protecting the valve rail.

According to an embodiment, the valve rail comprises one or more nozzles. An advantage of this is that the width of printing may be dynamically adjusted.

In still another embodiment, the at least one memory unit is arranged within the valve rail of the spray bar. An advantage of this is that it protects the memory unit.

In a third aspect, a method for managing data stored on a memory unit comprised in a replaceable component of a service tracking system according to the first aspect is provided. The method comprises the following steps: reading the latest run-time data of the replaceable component comprising the memory unit; and updating the run-time data of the replaceable component comprising the memory unit. An advantage of updating the run-time data is that current information is stored in case a connection breaks unexpectedly.

According to an embodiment, the method further comprises a step of initializing the memory unit. An advantage of this is that initializing increases security and gives more control over the content of the memory.

In another embodiment, the initializing step further comprises clearing the memory. An advantage of this is that all memory may be needed.

According to further embodiment, the initializing step further comprises storing a unique identifier. An advantage of this is that it guarantees that the memory unit is paired correctly.

In yet another embodiment, the initializing step is performed during manufacturing of the replaceable component. An advantage of this is that it reduces the potential for error.

According to an embodiment, the reading step further comprises storing the read run-time data. An advantage of this is that it may be used in other steps.

In another embodiment, the reading step is performed each time the comprising replaceable component establishes a connection to the controller. An advantage of this is that it ensures the run-time data is current.

According to further embodiment, the updating step is performed periodically during operation of the comprising replaceable component. An advantage of this is that it ensures that if connection is lost the run-time data is relatively updated.

In an embodiment, the updating step further comprises storing the data in an indexed storage of the memory unit. An advantage of this is that this simplifies the reading step.

According to an embodiment, the updating step further comprises storing the data with a time-stamp. An advantage of this is that this may be important during servicing.

In another embodiment, the updating step is performed automatically whenever the controller is about to lose connection to the replaceable component. An advantage of this is that it ensures that no data is lost.

According to a further embodiment, the updating step is performed after a manual command. An advantage of this is that it gives more control to a user.

In another embodiment, the method further comprises a step of alerting a user that a specific replaceable component requires service. An advantage of this is that it improves the user feedback.

According to an embodiment, the alerting step is performed in conjunction with the updating step if the data stored on the memory unit comprised in the replaceable component reaches one or more pre-programmed thresholds. An advantage of this is that this ensures that servicing is performed when needed.

In yet another embodiment, the method further comprises a step of logging events relating to a specific replaceable component to the comprised memory unit. An advantage of this is that it improves servicing.

According to an embodiment, the logging step is performed after a manual command. An advantage of this is that it gives more control to the user.

In still another embodiment, the logging step further comprises storing data input by a user. An advantage of this is that it gives more control to the user and improves servicing.

In a fourth aspect, a service tracking system according to the first aspect is provided, wherein the replaceable component is a cleaning cassette in a washing unit of a printing press.

According to another embodiment, the run-time data of the memory unit comprises the time that the comprising cleaning cassette has been operating for. An advantage of this is that operational time is useful as a measurement of when servicing is needed.

According to an embodiment, the run-time data of the memory unit comprises the amount of cleaning cloth that has been used by the comprising cleaning cassette. An advantage of this is that the amount of cleaning cloth used is useful as a measurement of when servicing is needed.

In an embodiment, the run-time data of the memory unit comprises the amount of fluid that has been used by the comprising cleaning cassette. An advantage of this is that the amount of fluid used is useful as a measurement of when servicing is needed.

Other objectives, features and advantages of the present invention will appear from the following detailed disclosure, from the attached claims, as well as from the drawings. It is noted that the invention relates to all possible combinations of features.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

By way of example, embodiments of the present invention will now be described with reference to the accompanying drawings, in which.

DETAILED DESCRIPTION

Figure 1:
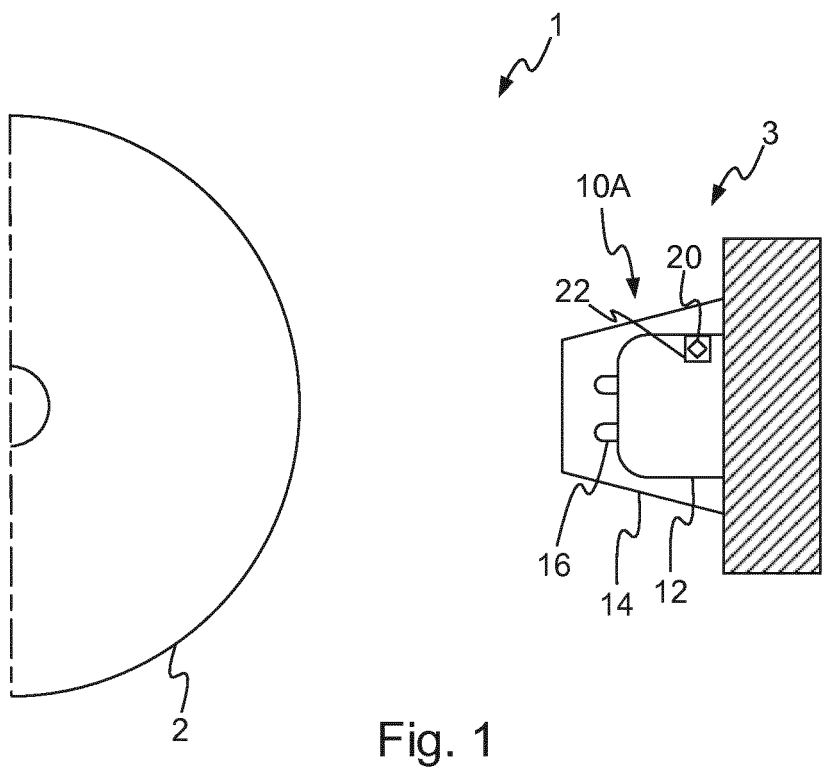
FIG. 1 shows a spray bar according to an embodiment of the invention.

Embodiments of the invention will now be described with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

Starting in FIG. 1, a replaceable spray bar 10A of a spray dampening system 3 of a printing press 1 according to an embodiment is shown. The printing press 1 may for instance be an offset printing press, but may also be a spray applicator 1', a spray chamber, a fabric treatment station or the like with similar replaceable components. The spray bar 10A comprises a valve rail 12 for administering fluids such as fountain solution to different parts of the printing press 1, for instance a printing cylinder 2. The valve rail 12 comprises one or more nozzles 16 for spraying the fluid, but other methods are possible. The valve rail 12 further comprises a valve rail enclosure for protecting the electronics of the valves. The spray bar 10A further comprises a shroud 14 for protecting the valve rail 12. The shroud 14 reduces the amount of fluids sprayed from the valve rail 12 splashing back on the valve rail 12 and entering the surroundings.

The spray bar 10A further comprises a memory unit 20 arranged in a water-proof housing 22. This is beneficial as there may be fluids in the spray bar 10A. The memory unit 20 may be arranged within the shroud 14 for protection. The memory unit 20 is preferably arranged within the valve rail 12 of the spray bar 10A. For instance, the memory unit 20 may be attached to the inside of the valve rail enclosure. The memory unit 20 is preferably attached during a manufacturing process using fastening means such as screws, bolts, adhesives or welding.

While the description will focus on the embodiment with a spray bar 10A, other replaceable components 10 in the printing press 1, spray applicator 1', or the like are possible. One non-limiting example of another such replaceable component 10 is a cleaning cassette 10B in a printing press 1. These are interchangeable and controlled by a controller 30 in a similar manner as spray bars 10A, so many of the teachings herein are applicable to cleaning cassettes 10B mutatis mutandis.

Figure 2:
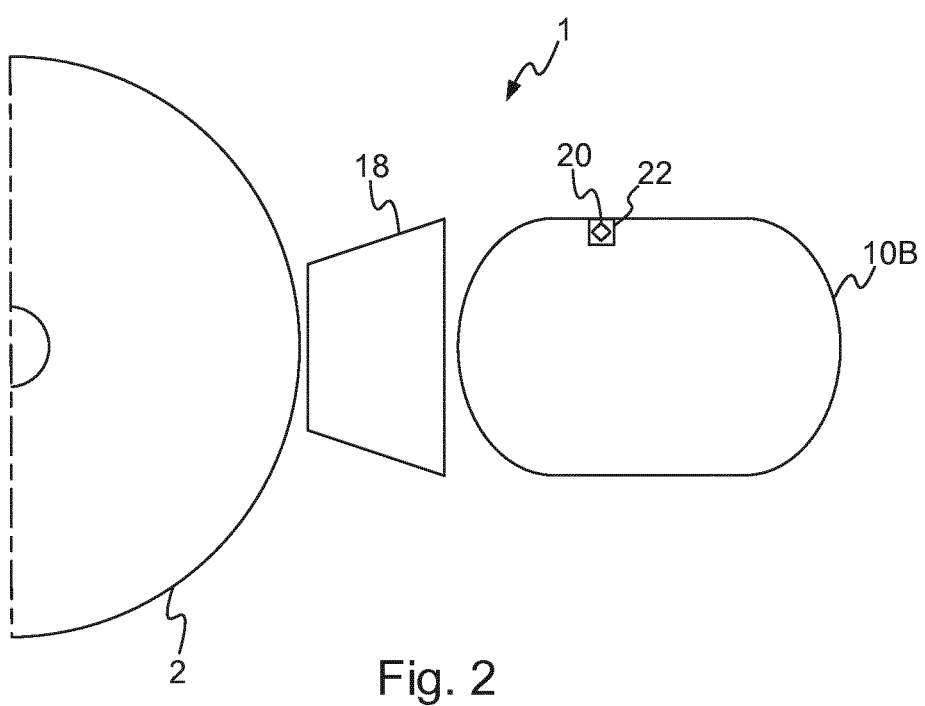
FIG. 2 shows a cleaning cassette according to an embodiment of the invention.

FIG. 2 shows such a cleaning cassette 10B according to an embodiment. The cleaning cassette 10B is arranged in a washing unit of a printing press 1. The printing press 1 may for instance be a flexographic printing press, or an offset printing press, but may also be a film cylinder cleaning system, a can cleaning system, a spray applicator, a spray chamber, a fabric treatment station or the like. A cleaning cloth (not shown) is guided by the cleaning cassette 10B, using a pad unit 18, into engagement with a blanket cylinder 2. This cleans the cylinder 2 using the cleaning cloth. The cleaning cassette 10B may further be configured to administer a cleaning fluid to the cleaning cloth as it is guided, for example using nozzles 16.

The cleaning cassette 10B further comprises a memory unit 20 arranged in a water-proof housing 22. This is beneficial as there may be fluids around the cleaning cassette 10B. The memory unit 20 is preferably attached during the manufacturing process using fastening means such as screws, bolts, adhesives or welding.

Figure 3A:
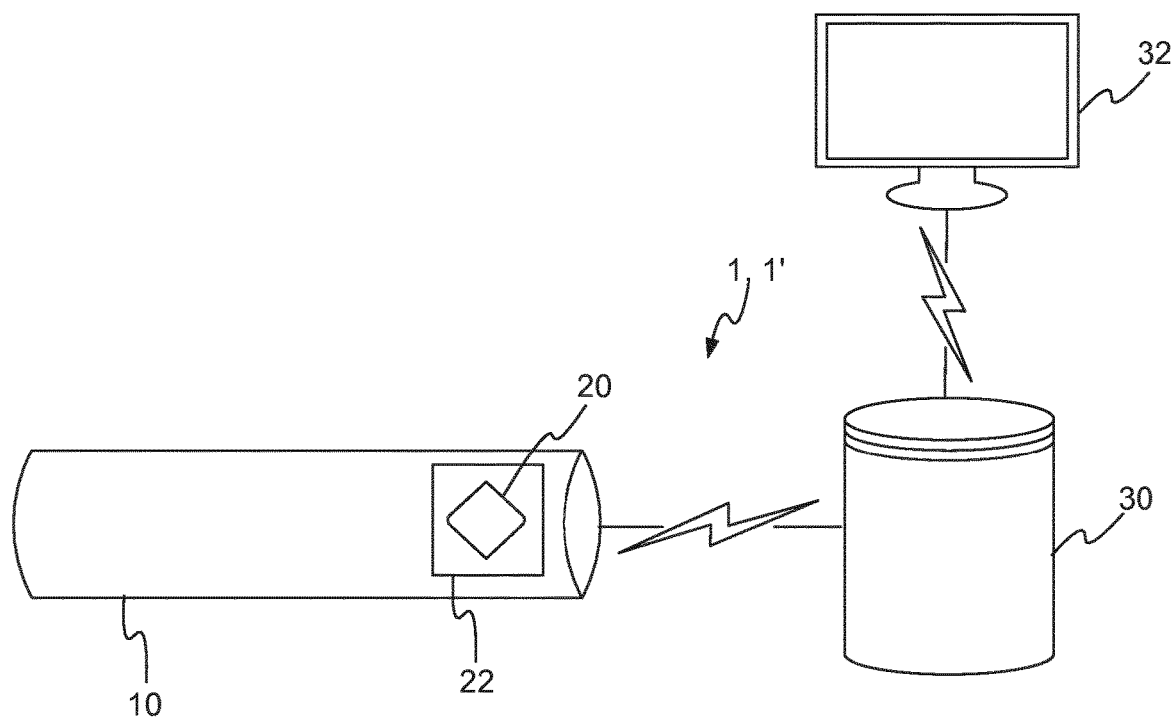
FIG. 3a shows a service tracking system according to an embodiment of the invention.

Turning to FIG. 3a, a service tracking system for a printing press 1, spray applicator 1', or the like according to an embodiment is shown. The service tracking system comprises a replaceable component 10 comprising a memory unit 20. The memory unit 20 is may be arranged in a water-proof housing 22 as there may be fluids in and/or around the replaceable component 10. The memory unit 20 is preferably attached during the manufacturing process using fastening means such as screws, bolts, adhesives or welding.

In other embodiments, there may be any number of replaceable components 10 in the same system which may be of different types, such as some being spray bars 10A and some being cleaning cassettes 10B. Each replaceable component 10 may comprise any number of memory units 20, wherein each of the memory units 20 stores data related to the specific replaceable component 10 comprising said memory units 20. They may be configured to store different types of data, or to simply store copies of the same data to be used as spares.

The service tracking system further comprises a controller 30 connected to the memory unit 20. The controller 30 is configured to control the operation of the replaceable component 10 and to periodically update data stored on the memory unit 20 related to run-time data regarding the operation of the specific replaceable component 10 comprising said memory unit 20.

The controller 30 may be implemented as one or more processors (CPU) or programmable logic controllers (PLC). It may be a single unit or divided into several parts. One controller 30 may be configured to control the operation of any number of replaceable components 10.

The memory unit 20 may be implemented in the shape of one or more memory chips using any commonly known technology for computer-readable memories such as ROM, RAM, SRAM, DRAM, FLASH, DDR, SDRAM or some other memory technology. Preferably, the memory technology used is non-volatile. In a preferred embodiment, the memory capacity is relatively low to keep costs down, such as 256 kB. The capacity may be larger to support future demands. The skilled person will understand that this also puts restraints on how the data stored on the memory is encoded in order to be efficient.

The periodicity of the updates may be anything from a set interval to whenever a user requests it or whenever the run-time data is changed. A set interval may for example be every year, every month, every week, every day, every few hours or more preferably every few minutes; such as roughly every twenty, ten, five, three or two minutes or most preferably every sixty minutes; or anything there between such as every ten to twenty minutes, every five to ten minutes, every three to five minutes or every one to three minutes, as well as every few seconds or fractions of a second. The periodicity of the updates may be limited by the amount of write cycles the memory of the memory unit 20 supports. Many non-volatile memories only support a limited number of write cycles before failure, e.g. with a typical EEPROM, data may only be written about 100 000 times.

Data related to run-time data may comprise any parameters that update continually in real-time as the replaceable component 10 is operational or being used in some way. This may include but is not limited to any combination of: the number of strokes the valves of the valve rail 12 of the replaceable component 10 has performed, the time that the replaceable component 10 has been operational, when and for how long the replaceable component 10 has been cleaned, the amount of cleaning cloth that the cleaning cassette 10B has used, i.e. the number of cloth feeds or air cylinder movements performed, the amount of fluid that the replaceable component 10 has used, the total output of the replaceable component 10 or the total input of the replaceable component 10.

Depending on factors such as fabric or web width, the number of valves being in use in each replaceable component 10 may vary. Because of this, it may be beneficial to keep track of run-time data related to each individual valve of the valve rail 12 of the replaceable component 10, such as the number of strokes each individual valve has performed or the operational time of each individual valve.

In one embodiment, the run-time data of the memory unit 20 is updated during the operation of the comprising replaceable component 10. This conserves energy as the run-time data only changes at this time. It also reduces the amount of write cycles.

The memory unit 20 may also comprise other data, such as a unique identifier corresponding to the specific replaceable component 10 comprising the memory unit 20; an event log for events related to said comprising replaceable component 10; or data used during the operation of said comprising replaceable component 10 such as calibration data.

The unique identifier may be a serial number matching the serial number printed or engraved on the replaceable component 10. It may also be any number of unique identifiers known to the skilled person such as a bar code, QR code or an RFID tag transmitted by an attached antenna.

The event log may be implemented using any indexed data structure for example using an array, a table or a collection such as a list, a set, a multiset, a tree or a graph. In a preferred embodiment, an event entry in the event log comprises a time-stamp for when the event was stored. The events may further comprise comments or notes input by a user as the event is logged or added at any time after that. It may be further beneficial to save events to the event log by manual command. In a preferred embodiment, the events saved to the event log are service events such as installations, cleanings, repairs or replacements. Other types of events are of course possible as well.

In one embodiment of the invention, data used during the operation of the replaceable component 10 such as calibration data is stored in the memory unit 20. This may be used to calibrate the printing press 1, spray applicator 1', or the like according to each individual replaceable component 10.

The controller 30 is connected to the replaceable component 10 in order to control its operation. The connections between the controller 30 and the memory unit 20 and the replaceable component 10 may be wired and/or wireless according to techniques known by the skilled person. In a preferred embodiment, the connection is wired in a series, where the wire with connectors between the controller 30 and the replaceable component 10 also comprise connectors between the controller 30 and the memory unit 20. The connectors for the replaceable component 10 are conventional male and female connectors. In order to conserve space and costs, the connectors for the memory unit 20 are heat shrink connectors. Preferably, heat-shrink techniques are used inside replaceable components 10 of printing press 1, spray applicator 1', or the like as it is water-proof. For instance, the valves are connected to the controller 30 in a heat-shrunk manner to protect the wires from fluids.

The controller 30 may encode and/or compress the data stored on the memory unit 20. This both conserves memory which allows for a smaller, cheaper memory and protects potentially valuable data from being easily accessible. This means that all controllers 30, 30' in the same system may need to use the same protocol when saving and reading data to/from the memory unit 20. Even without compression, controllers 30 accessing the memory unit 20 must have knowledge of a memory layout of the memory of the memory unit 20 in order to properly decode and encode the stored data.

The controller 30 will know how the run-time data is changed during operation as it controls the operation of the comprising replaceable component 10. In one embodiment, the run-time data of the memory unit 20 is read by the controller 30 each time the comprising replaceable component 10 establishes a connection to the controller 30. This may be for example when the replaceable component 10 is first installed, any time it replaces another replaceable component 10 or when the printing press 1, spray applicator 1', or the like is turned on in the morning. This conserves energy as the controller 30 may keep track of any updates as they happen and does not need to check the memory unit 20. The controller 30 may store the read run-time data on any memory, for example an internal memory. This internal memory may be volatile, as the data only needs to be stored until the replaceable component 10 next establishes a connection with the controller 30.

In one embodiment, the controller 30 is in communication with a display 32. The display 32 may for instance be one or more screens such as an LCD screen or a type of LED screen; or it may be a light, a projected image or a hologram. The controller 30 may be connected to the display 32 using a wired or wireless connection as is known by the skilled person. The display 32 may be in close proximity to the printing press 1, spray applicator 1', or the like or in a separate facility.

The controller 30 may be further configured to display service notifications on the display 32 related to a specific replaceable component 10 when the data stored on the memory unit 20 comprised in said replaceable component 10 reaches one or more pre-programmed thresholds.

Service notifications are preferably visual and displayed on the display 32, such as a pop-up window, a colored indicator or a blinking light. They may comprise additional information about why the notification is displayed or what action may need to be taken. They may additionally or alternatively be displayed on one or more different displays 32 and/or use audial notifications. The notification may be displayed in proximity to where action needs to be taken or in a completely separate facility. In one embodiment the notification is displayed simultaneously on a display 32 near the printing press 1, spray applicator 1', or the like and on a display 32 at an external servicing company that may assist in taking action. The notification may be directed towards factory workers at the printing facility or other types of factories, an external servicing company or any other interested party.

In conjunction with or instead of displaying a service notification, the controller 30 may be configured to automatically request service for a specific replaceable component 10 when the data stored on the memory unit 20 comprised in said replaceable component 10 reaches one or more pre-programmed thresholds. This request may take the form of an automated communication, for example a pre-recorded message sent by telephone, text, fax, mail, email or a dedicated phone, browser or computer application. It may also use existing system components to display a service order on a connected display 32. The request may be directed towards a servicing team at the printing facility, an external servicing company or any other interested party.

Examples of such thresholds may include but are not limited to specific run-time data parameter values such as: a specific number of strokes of the valves of the valve rail 12 of the replaceable component 10 has performed, a specific time that the replaceable component 10 has been operational, a specific amount of times the replaceable component 10 has been cleaned, a specific amount of cleaning cloth that the cleaning cassette 10B has used, i.e. a specific number of cloth feeds or air cylinder movements performed, a specific amount of fluid that the replaceable component 10 has used, a specific total output of the replaceable component 10 or a specific total input of the replaceable component 10.

Depending on factors such as fabric or web width, the number of valves being in use in each replaceable component 10 may vary. Because of this, it may be beneficial to use a threshold related to an individual valve of the valve rail 12 of the replaceable component 10, such as the number of strokes each individual valve has performed or the operational time of each individual valve.

The thresholds may further include other types of data, such as the unique identifier, the event log or calibration data. For example the unique identifier may contain information about the type and manufacturing date of the replaceable component 10. If a specific product line has been found to be malfunctioning, an update to the controller 30 may use the unique identifier as a threshold to trigger a service notification recalling all replaceable components 10 of that specific product line. The controller 30 may also be configured to use the unique identifier as a threshold to trigger a service notification for replaceable components 10 reaching a certain age, regardless of how it has been used. The event log may trigger a service reminder if a specific replaceable component 10 has not been serviced for a certain time threshold or if an unusual series of events occur. If the calibration data has extreme values or is being misused, this may also be used as a threshold.

The different thresholds may also be combined for further beneficial effect. For example a high number of strokes combined with a high operational time may constitute a threshold. The time of the most recent service event combined with the number of strokes performed since that time may preferably be used as a threshold.

Figure 3B:
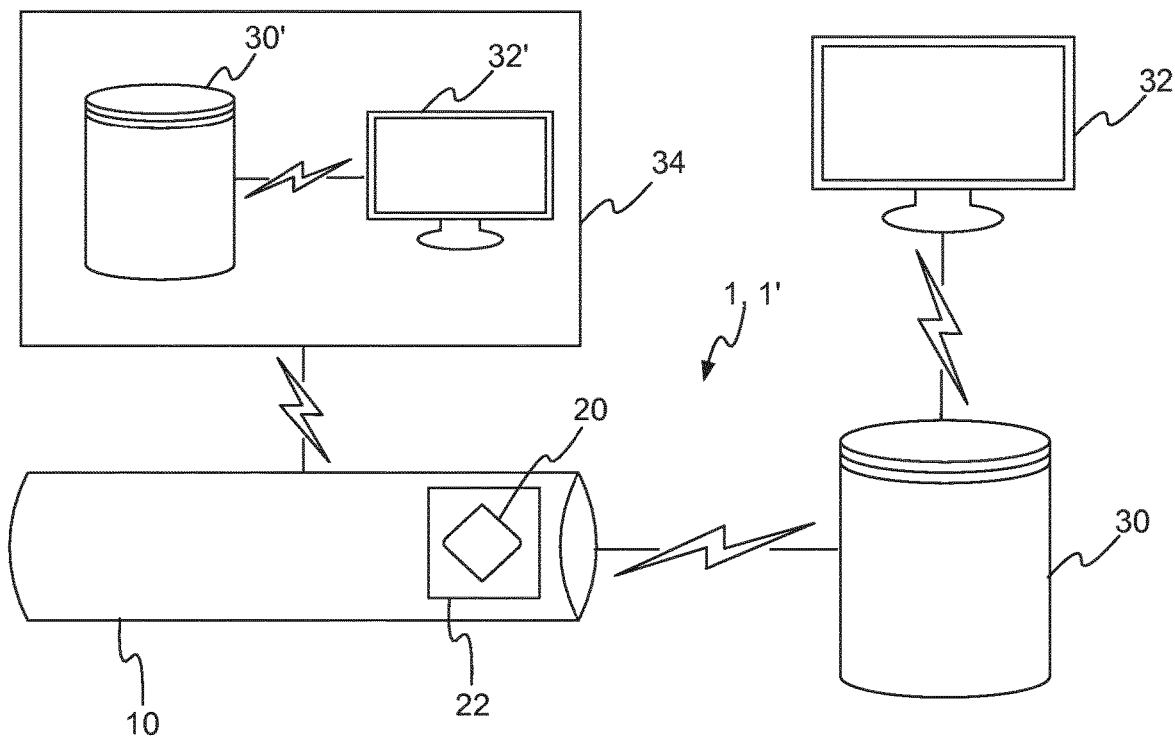
FIG. 3b shows a service tracking system according to an embodiment of the invention.

FIG. 3*b* shows a similar service tracking system as in FIG. 3*a*, which further comprises a service station 34 for performing service on the replaceable component 10. The service station 34 is a separate unit with its own service controller 30' and an optional service display 32'. These communicate with each other and the replaceable component 10 in a similar manner as the above embodiment, however the controller 30' of the service station 34 is configured to control the operation of servicing and to log service events related to the replaceable component 10 to the event log in the comprised memory unit 20.

The service station 34 may for example be a handheld device arranged to do quick measurements during operation or a specific service section of the printing press 1, spray applicator 1', or the like where the replaceable component 10 is plugged in for rigorous testing, cleaning, calibration and maintenance. The service station 34 may simply be a dedicated area for servicing with an interface 30', 32' for registering or requesting service events. The service station 34 may further comprise automated service units dedicated to different kinds of servicing that are controlled by the service controller 30'.

The service controller 30' is at least configured to control the operation of servicing the replaceable component 10 but may also control other functions such as its operation. Servicing may include installations, cleanings, repairs or replacements. In one embodiment, servicing comprises manually replacing various internal parts of the replaceable component 10 and using the service station 34 to direct the service controller 30' to store service events in the event log. This may be the only operation of servicing the service controller 30' is configured to control. In another embodiment, servicing is performed by automated service units comprised in the service station 34 and controlled by the service controller 30', each service unit being dedicated to one or more of the different kinds of available service options.

The replaceable component 10 may be connected to both of the controllers 30, 30' at the same time, however in one embodiment the replaceable component 10 is connected to the operation controller 30 during normal operation and connected to the service controller 30' during service. In another embodiment, the operation controller 30 will have some or all of the functionality provided by a dedicated service controller 30'. In this embodiment, the replaceable component 10 only needs to be connected to one controller 30 at all times.

No matter the type of servicing, it may be beneficial to store service events in the event log. This may be done automatically as the service controller 30' controls the operation of servicing and logs the appropriate service events as they occur. This may also be done manually by a user inputting a request to log a specific service event before, after or as it happens. The service event may comprise the type of servicing and/or when and/or where it is taking place. The service event may further comprise comments or notes input by a user as the service event is logged or added at any time after that.

Figure 4:
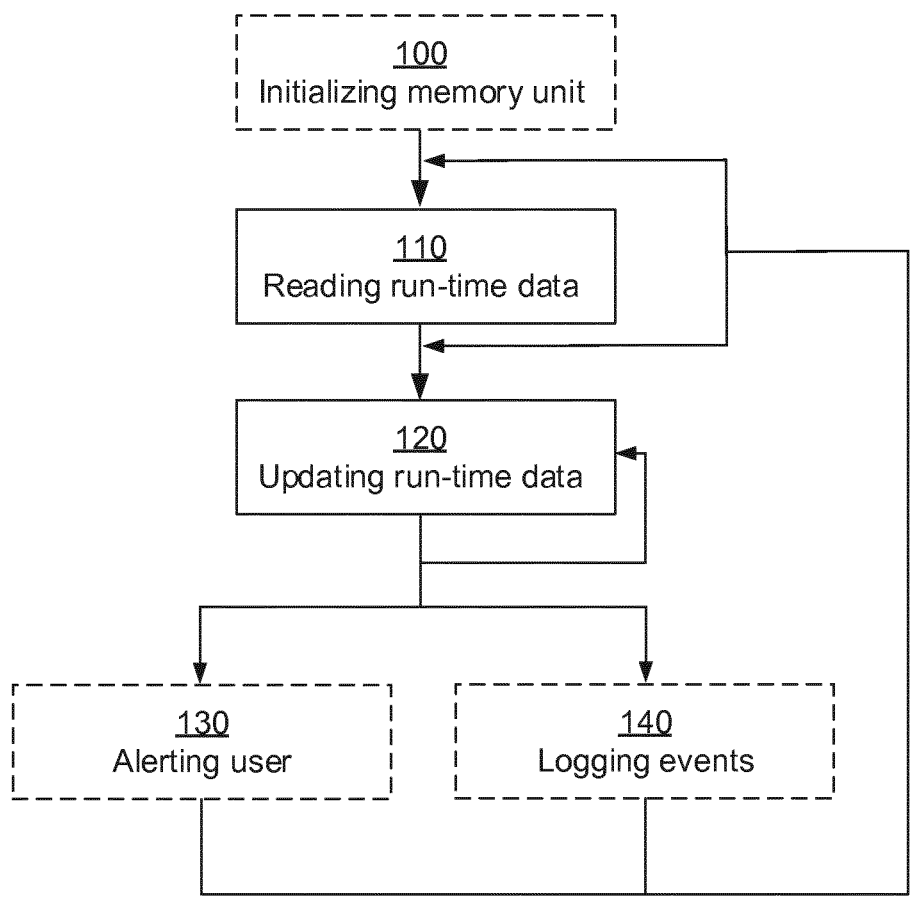
FIG. 4 shows a flowchart of a method for managing data stored on a memory unit according to an embodiment of the invention.

FIG. 4 shows a flowchart of a method for managing data stored on a memory unit 20 comprised in a replaceable component 10 according to an embodiment. The method may comprise the steps of: initializing 100 the memory unit 20; reading 110 the latest run-time data of the replaceable component 10 comprising the memory unit 20; updating 120 the run-time data of the replaceable component 10 comprising the memory unit 20; alerting 130 a user that a specific replaceable component 10 requires service; and logging 140 events relating to a specific replaceable component 10 to the comprised memory unit 20. These steps may be performed in any order, some may be skipped and others repeated and different steps may be performed by different controllers 30.

The initializing step 100 comprises installing the memory unit 20 by for example attaching the connectors and/or booting up, formatting and/or reserving space in the memory. The initializing step 100 may further comprise clearing the memory and/or storing a unique identifier corresponding to the specific replaceable component 10 comprising said memory unit 20. The initializing step 100 is preferably performed during the manufacturing of the replaceable component 10.

The reading step 110 comprises the controller 30 reading the latest run-time data of the replaceable component 10 from the comprised memory unit 20. The reading step 110 may further comprise reading other types of data stored in the memory unit 20, such as the unique identifier or calibration data. The reading step 110 may yet further comprise storing the read data as described earlier. This may be used in later steps such as the updating step 120 or the alerting step 130. The reading step 110 may be performed periodically and is preferably performed each time the comprising replaceable component 10 establishes a connection to the controller 30 as described earlier.

The updating step 120 comprises the controller 30 updating the run-time data of the replaceable component 10 stored in the comprised memory unit 20. This may mean overwriting the run-time data already stored there with new data based on the operation of said replaceable component 10 being operated by the controller 30. This may be done by adding the new run-time data to the old or by using the previously read run-time data, calculating the new parameter values based on how they have changed since the previously read data and replacing the stored run-time data with the newly calculated parameter values. This is preferably done periodically during operation of said comprising replaceable component 10 as described earlier. The controller 30 may therefore need to keep track of when the latest update step 120 occurred. This information may be stored with the memory unit 20, the controller 30 or any other memory.

The run-time data is preferably stored in an indexed storage of the memory unit 20 with a time-stamp. This simplifies the reading step 110 and is in accordance with a predefined memory layout. The update step 120 may be performed after a manual command. The update step 120 may further be performed automatically whenever the controller 30 is about to lose connection to the replaceable component 10, such as when the replaceable component 10 is being removed or the printing press 1, spray applicator 1', or the like is being shut down.

The alerting step 130 comprises the controller 30 alerting a user that a specific replaceable component 10 requires service. This may be done using service notifications or an automatic service request as described earlier. The alerting step 130 may be performed in conjunction with, i.e. before, during or after, the updating step 120 if the data stored on the memory unit 20 comprised in said replaceable component 10 reaches one or more pre-programmed thresholds as described earlier.

The logging step 140 comprises the controller 30 logging events relating to a specific replaceable component 10 to the comprised memory unit 20. These may be stored in an indexed storage of the memory unit 20 and/or with a time-stamp. The logging step 140 may be performed after a manual command and/or may contain data input by a user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although the replaceable component or member 10 has been described as a spray bar 10A or cleaning cassette 10B included in an offset printing press 1, many other designs are possible. For instance, the replaceable member 10 can be a spray unit or fluid applicator included in a machine for spraying or applying liquid or fluid to a web of fabric passing through the machine. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A service tracking system for a spray applicator, said system comprising:
　　at least one replaceable component of the spray applicator, the replaceable component being in the shape of a spray bar, the replaceable component comprising at least one memory unit; and a controller connected to said at least one memory unit,
wherein the controller is configured to control the operation of said at least one replaceable component and to periodically update data stored on each memory unit related to run-time data regarding operation of the specific replaceable component; and
wherein the run-time data of the memory unit comprises operational time data related to operational time of valves of a valve rail of the spray bar.

2. The service tracking system according to claim 1, wherein the memory unit comprises a unique identifier corresponding to the specific replaceable component.

3. The service tracking system according to claim 1, wherein the replaceable component comprises a spray bar adapted and configured to be used in a spray dampening system of a printing press.

4. The service tracking system according to claim 1, wherein the run-time data of each memory unit is updated during operation of the replaceable component.

5. The service tracking system according to claim 1, wherein the run-time data of the memory unit is read by the controller each time the replaceable component establishes a connection to the controller.

6. The service tracking system according to claim 1, wherein the memory unit is arranged in a water-proof housing.

7. The service tracking system according to claim 1, wherein the controller is in communication with a display.

8. The service tracking system according to claim 7, wherein the controller is further configured to display service notifications on the display related to a specific replaceable component when the data stored on the memory unit of said replaceable component reaches one or more pre-programmed thresholds.

9. The service tracking system according to claim 1, wherein the controller is configured to automatically request service for a specific replaceable component when the data stored on the memory unit of said replaceable component reaches one or more pre-programmed thresholds.

10. The service tracking system according to claim 1, wherein the memory unit further comprises an event log for events related to the associated replaceable component.

11. The service tracking system according to claim 10, wherein events are saved to the event log by manual command.

12. The service tracking system according to claim 10, further comprising a service station for performing service on the replaceable component, wherein the service station comprises a service controller in communication with said at least one memory unit and configured to control the operation of servicing and to log service events related to the replaceable component to the event log in the memory unit.

13. The service tracking system according to claim 12, wherein the service station further comprises a service display comprising a user interface that allows for a manual command to log service events.

14. A service tracking system for a spray applicator, said system comprising:
at least one replaceable component of the spray applicator, the replaceable component being in the shape of a spray bar, the replaceable component comprising at least one memory unit; and
a controller connected to said at least one memory unit,
wherein the controller is configured to control the operation of said at least one replaceable component and to periodically update data stored on each memory unit related to run-time data regarding operation of the specific replaceable component; and
wherein the run-time data of the memory unit comprises a number of strokes performed by valves of a valve rail of the spray bar.

15. A service tracking system for a spray applicator, said system comprising:
at least one replaceable component of the spray applicator, the replaceable component being in the shape of a spray bar, the replaceable component comprising at least one memory unit; and
a controller connected to said at least one memory unit,
wherein the controller is configured to control the operation of said at least one replaceable component and to periodically update data stored on each memory unit related to run-time data regarding operation of the specific replaceable component; and
wherein the run-time data of the memory unit comprises cleaning data related to when and for how long a valve rail of the spray bar have been cleaned.

* * * * *